United States Patent
Kobayashi et al.

(10) Patent No.: US 11,767,239 B2
(45) Date of Patent: Sep. 26, 2023

(54) FILTER AND METAL ION REMOVAL DEVICE

(71) Applicant: 3M INNOVATIVE PROPERTIES COMPANY, St. Paul, MN (US)

(72) Inventors: Mitsuaki Kobayashi, Tokyo (JP); Hideyuki Okada, Yamato (JP); Yukihisa Okada, Tokyo (JP); Takaaki Shirai, Tokyo (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 297 days.

(21) Appl. No.: 17/053,479

(22) PCT Filed: May 29, 2019

(86) PCT No.: PCT/IB2019/054459
§ 371 (c)(1),
(2) Date: Nov. 6, 2020

(87) PCT Pub. No.: WO2019/229679
PCT Pub. Date: Dec. 5, 2019

(65) Prior Publication Data
US 2021/0230022 A1   Jul. 29, 2021

(30) Foreign Application Priority Data
May 31, 2018   (JP) .................................. 2018-104598

(51) Int. Cl.
*C02F 1/42* (2023.01)
*B01J 39/05* (2017.01)
(Continued)

(52) U.S. Cl.
CPC ................ *C02F 1/42* (2013.01); *B01D 39/16* (2013.01); *B01D 39/1661* (2013.01);
(Continued)

(58) Field of Classification Search
None
See application file for complete search history.

(56) References Cited

U.S. PATENT DOCUMENTS 3,667,532 A * 6/1972 Kurz ...................... A47C 1/143
160/404
4,182,676 A * 1/1980 Casolo ..................... B01J 39/05
210/686
(Continued)

FOREIGN PATENT DOCUMENTS

CN    106673110 A    5/2017
JP    H05-234876 A   9/1993
(Continued)

OTHER PUBLICATIONS

International Search Report for PCT International Application No. PCT/IB2019/054459, dated Oct. 15, 2019, 4 pages.

*Primary Examiner* — Chester T Barry
(74) *Attorney, Agent, or Firm* — 3M Innovative Properties Company

(57) ABSTRACT

To provide a filter capable of efficiently removing metal ions in a treatment liquid, and capable of easily obtaining a solution having an extremely low metal ion content. A depth filter includes a porous molded article. The porous molded article is a sintered material of mixed powder or a swollen material of the sintered material. The mixed powder contains dried gel powder and thermoplastic resin powder. The dried gel powder contains an ion exchange resin including a sulfonic acid group, and a nitrogen-containing chelating resin.

3 Claims, 4 Drawing Sheets

(51) Int. Cl.
  *B01J 47/018* (2017.01)
  *B01D 39/16* (2006.01)
  *B01J 45/00* (2006.01)
  *B01J 47/026* (2017.01)
  *B01J 47/04* (2006.01)
  *C02F 101/20* (2006.01)
  *C02F 103/04* (2006.01)

(52) U.S. Cl.
  CPC ............... *B01J 39/05* (2017.01); *B01J 45/00* (2013.01); *B01J 47/018* (2017.01); *B01J 47/026* (2013.01); *B01J 47/04* (2013.01); *B01D 2201/182* (2013.01); *B01D 2239/0414* (2013.01); *B01D 2239/1291* (2013.01); *C02F 2001/425* (2013.01); *C02F 2101/203* (2013.01); *C02F 2103/04* (2013.01)

(56) References Cited

U.S. PATENT DOCUMENTS

| | | | | |
|---|---|---|---|---|
| 5,446,125 | A * | 8/1995 | Honda | C08F 6/06 430/192 |
| 6,375,850 | B1 | 4/2002 | Deacon | |
| 6,379,551 | B1 * | 4/2002 | Lee | C08J 5/225 210/651 |
| 7,112,272 | B2 * | 9/2006 | Hughes | B01D 39/1661 264/41 |
| 7,758,953 | B2 | 7/2010 | Koizumi | |
| 10,688,411 | B2 * | 6/2020 | Kobayashi | B01J 20/261 |
| 10,722,878 | B1 * | 7/2020 | Kolomitsyn | B01J 41/07 |
| 2004/0212123 | A1 * | 10/2004 | Koizumi | B01J 20/2803 264/122 |
| 2012/0270963 | A1 * | 10/2012 | Suzumura | C09D 7/48 522/28 |
| 2015/0083667 | A1 * | 3/2015 | Stouffer | B01J 20/28042 521/29 |
| 2017/0333810 | A1 * | 11/2017 | Kobayashi | B01D 15/08 |

FOREIGN PATENT DOCUMENTS

| | | | | |
|---|---|---|---|---|
| JP | | 2763044 | 6/1998 | |
| JP | | 2002-239320 | 8/2002 | |
| JP | | 2003-519147 | 6/2003 | |
| JP | | 3506213 | 3/2004 | |
| JP | | 2005-213200 | 8/2005 | |
| JP | | 2010-254841 | 11/2010 | |
| WO | WO-2013151654 | A1 * | 10/2013 | ........... B01D 15/361 |
| WO | WO-2016126574 | A1 * | 8/2016 | ............. B01D 15/08 |

* cited by examiner

FILTER AND METAL ION REMOVAL DEVICE

CROSS REFERENCE TO RELATED APPLICATIONS

This application is a national stage filing under 35 U.S.C. 371 of PCT/IB2019/054459, filed May 29, 2019, which claims the benefit of Japanese Patent Application No. 2018-104598, filed May 31, 2018, the disclosures of which are incorporated by reference in their entirety herein.

TECHNICAL FIELD

The present disclose relates to a filter (purifier) and a metal ion removal device.

BACKGROUND ART

A solution having a low metal ion content has hitherto been demanded as a solution used in manufacturing of an electronic component such as an integrated circuit. For example, Patent Document 1 describes a metal compound removal device that reduces a metal content in a surfactant down to a ppb level that allows use in a high-performance semiconductor material.

CITATION LIST

Patent Document 1—JP 2005-213200 A

SUMMARY OF INVENTION

In recent years, electronic components have been becoming more and more elaborate. When the width of wiring is narrowed owing to such elaboration, even only subtle impurities may produce an adverse effect. For this reason, an allowable metal ion content of a solution for electronic component manufacturing has been more and more reduced, from an aspect of securing stability. For example, removal of metal ions down to a level even lower than a ppb level has been expected. However, with a conventional method, thorough reduction of a metal ion content may be difficult. In addition, a method in the related art may have many work processes, and thus may be inefficient.

In one aspect, the present disclosure is directed to providing a filter capable of efficiently removing metal ions in a treatment liquid, and capable of easily obtaining a solution having an extremely low metal ion content. Further, in one aspect, the present disclosure is directed to providing a metal ion removal device using the above filter.

Solution to Problem

A first aspect of the present disclosure is directed to a depth filter. The depth filter includes a porous molded article. The porous molded article is a sintered material of mixed powder or a swollen material of the sintered material. The mixed powder contains dried gel powder and thermoplastic resin powder. The dried gel powder contains an ion exchange resin including a sulfonic acid group, and a nitrogen-containing chelating resin.

The depth filter is formed by using the dried gel powder containing an ion exchange resin and a nitrogen-containing chelating resin. Consequently, according to the depth filter, metal ions in a treatment liquid can be efficiently removed.

In one aspect, a ratio (C1/C2) of a content C1 of the ion exchange resin to a content C2 of the nitrogen-containing chelating resin may be 0.1 or more and 100 or less in a mass ratio.

In one aspect, when 100 parts by mass of the porous molded article is immersed in 500 parts by mass of propylene glycol 1-monomethyl ether 2-acetate at 23° C. in 12 hours, a sulfuric acid ion content in an immersion liquid may be 0.03 ppm or less.

In one aspect, when water having a specific electrical resistance value of 18 MΩ·cm or greater is caused to pass through the depth filter at a space velocity of 1200 hr-1, a specific electrical resistance value of the water after being caused to pass through the depth filter may be 15 MΩ·cm or greater.

A second aspect of the present disclosure is directed to a metal ion removal device. The metal ion removal device includes a first filter, and a second filter configured to remove metal ions from a treatment liquid that has passed through the first filter. In the metal ion removal device, the first filter may be a filter including a porous molded article. The porous molded article is a sintered material of mixed powder or a swollen material of the sintered material. The mixed powder contains dried gel powder including a nitrogen-containing chelating resin, and thermoplastic resin powder. Further, the second filter may be the depth filter according to the first aspect described above.

In one aspect, the first filter may be a filter configured such that, when water having a specific electrical resistance value of 18 MΩ·cm or greater is caused to pass through the first filter at a space velocity of 1200 hr-1, a specific electrical resistance value of the water after being caused to pass through the first filter is less than 15 MΩ·cm.

A third aspect of the present disclosure is directed to a depth filter. The depth filter includes a porous molded article. The porous molded article is a sintered material of mixed powder or a swollen material of the sintered material. The mixed powder contains dried gel powder including an ion exchange resin, and thermoplastic resin powder. In the depth filter, a number of particles of powder P1 contained on a surface per unit area is smaller than a number of particles of powder P2 contained on a cross-sectional surface per unit area. The surface is a surface of the porous molded article. The cross-sectional surface is a surface dividing the porous molded article into two in a thickness direction. Here, among particles of the dried gel powder, P1 denotes a particle of powder having a projected area 10 or more times as large as an average projected area of a particle of the thermoplastic resin powder. The projected area of the particle of the powder P1 is an area on the surface. P2 denotes a particle of powder having a projected area 10 or more times as large as an average projected area of a particle of the thermoplastic resin powder. The projected area of the particle of the powder P2 is an area on the cross-sectional surface.

According to the depth filter, the dried gel powder having a size largely different from a size of the thermoplastic resin powder is present more inside the depth filter, and less on a surface of the depth filter. Therefore, according to the depth filter, shedding of the ion exchange resin from the filter surface is less liable to occur, and thus a purer solution can be more easily obtained.

A fourth aspect of the present disclosure is directed to a depth filter. The depth filter includes a porous molded article. The porous molded article is a sintered material of mixed powder or a swollen material of the sintered material. The mixed powder contains dried gel powder including an ion exchange resin, and thermoplastic resin powder. In the depth filter, an average particle diameter of the dried gel powder is two or more times as large as an average particle diameter of the thermoplastic resin powder. Further, according to the depth filter, when each of a surface of the porous molded article and a cross-sectional surface dividing the porous molded article into two in a thickness direction is observed with a scanning electron microscope in a range of a field of view of 950 µm×950 µm and subsequently a projected area of five particles having large projected areas of the dried gel powder is calculated in each field of view, the average projected area on the surface is smaller than the average projected area on the cross-sectional surface.

According to the depth filter, the dried gel powder having a size largely different from a size of the thermoplastic resin powder is present more inside the depth filter, and less on a surface of the depth filter. Therefore, according to the depth filter, shedding of the ion exchange resin from the filter surface is less liable to occur, and thus a purer solution can be more easily obtained.

In one aspect, the ion exchange resin may be an ion exchange resin including a sulfonic acid group. The dried gel powder may further include a nitrogen-containing chelating resin.

In one aspect, a ratio (C1/C2) of a content C1 of the ion exchange resin to a content C2 of the nitrogen-containing chelating resin may be 0.1 or greater and 100 or less in a mass ratio.

A fifth aspect of the present disclosure is directed to a metal ion removal device. The metal ion removal device includes a first filter, and a second filter configured to remove metal ions from a treatment liquid that has passed through the first filter. In the metal ion removal device, the first filter may be a filter including a porous molded article. The porous molded article is a sintered material of mixed powder or a swollen material of the sintered material. The mixed powder contains dried gel powder including a nitrogen-containing chelating resin, and thermoplastic resin powder. Further, the second filter may be the depth filter according to the third or fourth aspect described above.

In one aspect, the first filter may be a filter configured such that, when water having a specific electrical resistance value of 18 MΩ·cm or greater is caused to pass through the first filter at a space velocity of 1200 hr-1, a specific electrical resistance value of the water after being caused to pass through the first filter is less than 15 MΩ·cm.

According to the present disclosure, a filter that removes metal ions in a treatment liquid to be capable of easily obtaining a solution having an extremely low metal ion content is provided. Further, according to the present disclosure, a metal ion removal device using the above filter is provided.

DESCRIPTION OF EMBODIMENTS

Figure 1:
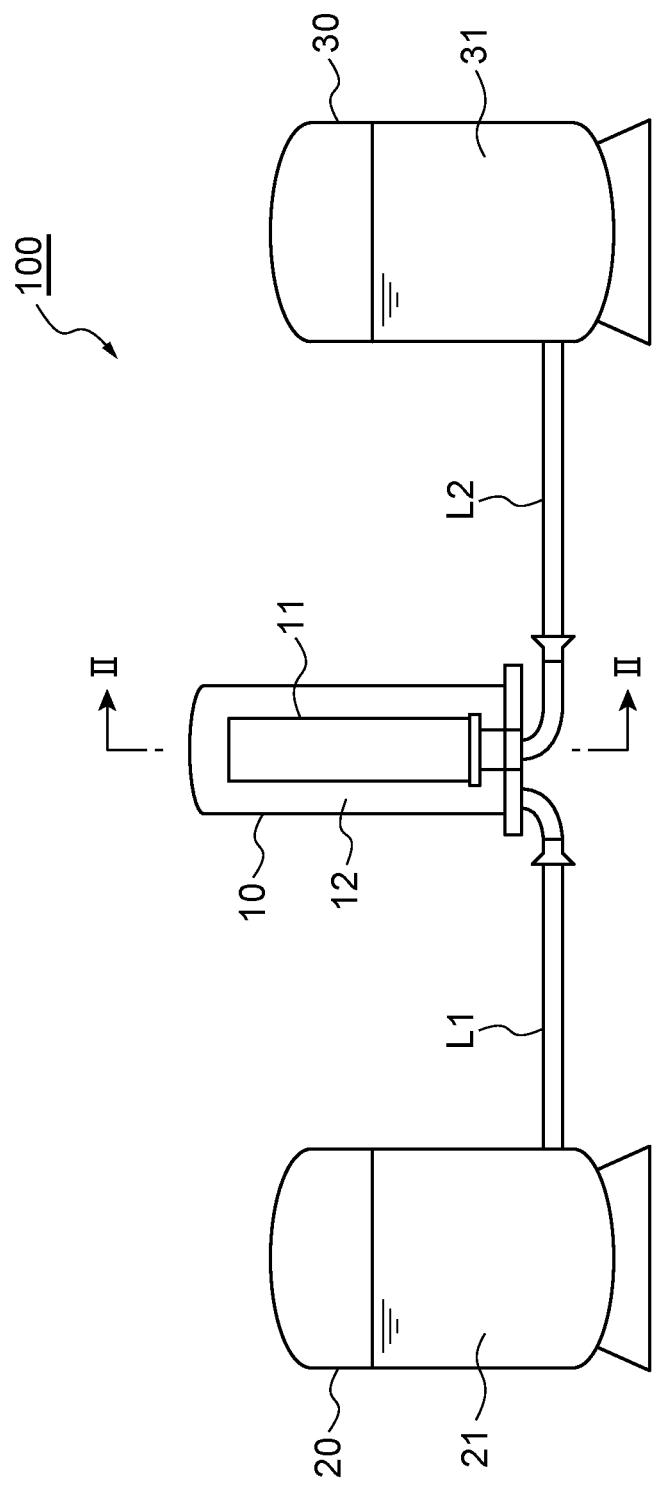
FIG. 1 is a diagram illustrating one embodiment of a metal ion removal device.

A preferred embodiment will be described below with reference to the drawings. Note that, for the sake of better understanding, a part of the drawings is illustrated with exaggeration, and a ratio of dimensions or the like is not limited to that illustrated in the drawings.

Filter

A filter according to the embodiment includes a porous molded article, which is a sintered material of mixed powder or a swollen material of the sintered material. The mixed powder contains dried gel powder and thermoplastic resin powder. The filter according to the embodiment can be preferably used to achieve an objective of removing metal ions from a treatment liquid to obtain a solution having a low metal ion content. The filter according to the embodiment may be a depth filter.

It is preferred that, in the filter according to the embodiment, the dried gel powder contain an ion exchange resin including a sulfonic acid group, and a nitrogen-containing chelating resin. According to such a filter, metal ions in a treatment liquid can be more efficiently removed, and a solution having an extremely low metal ion content can be easily obtained.

In the embodiment, the above sintered material may have strength capable of free standing, and the dried gel powder may be fixed by the thermoplastic resin powder. Further, in the embodiment, since the dried gel powder is fixed by the thermoplastic resin powder in the above sintered material, the strength capable of free standing is maintained even when dimensional change occurs due to swelling of the dried gel powder. In other words, the above porous molded article may have strength capable of free standing in any of the sintered material and the swollen material of the sintered material.

A known adsorbent material using a gel material causes significant dimensional change and strength reduction due to water absorption of the gel material, for example. Therefore, generally, the gel material has hitherto been held by a supporting medium, or formed into a bead-like shape. In contrast, the filter according to the embodiment may be a filter capable of free standing as described above. In this case, metal ions can be efficiently removed in a space-saving manner.

In the embodiment, it is only necessary that the dried gel powder be powder that absorbs water to be swollen and exhibit a gelled form. For example, the dried gel powder can be obtained by drying hydrogel particles.

The dried gel powder includes an ion exchange resin. The ion exchange resin may be a resin including an ion exchange group or a chelate group. Note that it can also be said that the ion exchange resin including a chelate group is a chelating resin. Examples of the ion exchange group include a sulfonic acid group, a carboxylic acid group, a tertiary amino group, and a quaternary ammonium group. Examples of the tertiary amino group include dialkylamino group (a group represented by —NR12 (R1 each independently represents a substituted or unsubstituted alkyl group)). More specific examples of the tertiary amino group include a dimethylamino group, and a diethylamino group. Further, examples of the quaternary ammonium group include a trialkylammonium group (a group represented by —N+R23 (R2 each independently represents a substituted or unsubstituted alkyl group)). More specific examples of the quaternary ammonium group include a trimethylammonium group, a dimethylammonium group, and a dimethyl hydroxyethyl ammonium group. Among these, as the ion exchange group, a sulfonic acid group is preferred. Examples of the chelate group include polyamine, an aminophosphoric acid group, an iminodiacetic acid group, a urea group, a thiol group, and a dithiocarbamic acid group. Among these, as the chelate group, a chelate group including a nitrogen atom (such as polyamine, an aminophosphoric acid group, an iminodiacetic acid group, a urea group, and a dithiocarbamic acid group) is preferred, and polyamine, an aminophosphoric acid group, and an iminodiacetic acid group are more preferred.

The ion exchange resin may be a resin such as polystyrene, an acrylic resin, polyvinyl alcohol, cellulose, and polyamide. These resins may be modified to include the ion exchange group or chelate group described above, or may be crosslinked with a crosslinking agent such as divinylbenzene.

As described above, it is preferred that the dried gel powder contain an ion exchange resin including a sulfonic acid group, and a nitrogen-containing chelating resin. Here, it can also be said that the nitrogen-containing chelating resin is an ion exchange resin including a chelate group including a nitrogen atom. In this case, the dried gel powder may be powder containing first dried gel powder containing an ion exchange resin including a sulfonic acid group, and second dried gel powder containing a nitrogen-containing chelating resin. Further, the dried gel powder may be powder containing dried gel powder that is formed of a mixture of an ion exchange resin including a sulfonic acid group, and a nitrogen-containing chelating resin. According to such a combination of the ion exchange resin and the nitrogen-containing chelating resin, even when a plurality of metal ions are contained in a treatment liquid (e.g., iron ions and sodium ions), each of the metal ions can be remarkably reduced. In other words, according to the above combination, metal ions in a treatment liquid can be more efficiently removed, and a solution having an extremely low metal ion content can be easily obtained.

A ratio ($C1/C2$) of a content $C1$ of the ion exchange resin including a sulfonic acid group to a content $C2$ of the nitrogen-containing chelating resin is preferably 0.1 or higher, and more preferably 1 or higher, in a mass ratio. With this configuration, metal ions can be more remarkably removed. Further, the above ratio ($C1/C2$) is preferably 100 or lower, and more preferably 50 or lower, in a mass ratio. With this configuration, elution of sulfuric acid ions from the filter can be remarkably suppressed.

The dried gel powder may further include an inorganic material. Examples of the inorganic material include silica gel, alumina gel, and smectite. These inorganic materials may be modified to include the ion exchange group or chelate group described above.

A water absorption rate of the dried gel powder is preferably 30 mass % or higher, and more preferably 40 mass % or higher. With this configuration, even when a treatment liquid contains a trace of moisture, the moisture can be efficiently removed, and metal ions can be more effectively removed. Further, the water absorption rate of the dried gel powder is preferably 90 mass % or lower, and more preferably 60 mass % or lower. With this configuration, strength of the porous molded article tends to be further enhanced.

Note that, in this specification, the water absorption rate of the dried gel powder shows a value that is calculated with a loss on drying method in accordance with JIS K 7209: 2000. More specifically, weight ($W1$) of a swollen gel, which is obtained by causing dried gel powder to be swollen with enough water, is measured. Subsequently, the swollen gel is dried in an oven (DRM620DB manufactured by Advantec Toyo Kaisha, Ltd. (Bunkyo-ku, Tokyo)) at 105° C. for 24 hours or more, and then dry-weight ($W2$) is measured. The water absorption rate is calculated based on Equation (I) below.

$$\text{Water absorption rate (\%)} = (W1-W2) \times 100/W1 \quad \text{(I)}$$

For example, an average particle diameter $d1$ of the dried gel powder may be 0.1 μm or greater, and is preferably 1 μm or greater. Further, for example, the average particle diameter $d1$ of the dried gel powder may be 500 μm or less, and is preferably 200 μm or less.

For example, the dried gel powder can be obtained by drying hydrogel particles. A drying method is not particularly limited. Examples of the drying method may include drying with hot air, drying with agitation, and vacuum drying.

It is preferred that the dried gel powder be powder that is dried to have a water content of 10 mass % or less. The water content of the dried gel powder is preferably 10 mass % or less, and more preferably 5 mass % or less.

Note that, in this specification, the water content of the dried gel powder shows a value that is measured with a loss on drying method. Specifically, weight ($W3$) of dried gel powder is measured. Subsequently, the dried gel powder is dried in an oven (DRM620DB manufactured by Advantec Toyo Kaisha, Ltd. (Bunkyo-ku, Tokyo)) at 105° C. for 24 hours or more, and then dry-weight ($W4$) is measured. The water absorption rate is calculated based on Equation (II) below.

$$\text{Water content (\%)} = (W3-W4)/W3 \times 100 \quad \text{(II)}$$

In the embodiment, the thermoplastic resin powder is powder made of a resin material containing a thermoplastic resin as a main component. Particles of the thermoplastic resin powder are partly fused together through sintering, and can thereby form a porous structure.

A content of the thermoplastic resin in the thermoplastic resin powder is preferably 80 mass % or greater, more preferably 90 mass % or greater, and even more preferably 95 mass % or greater, based on the total mass of the thermoplastic resin powder.

The thermoplastic resin powder may further contain another component different from a thermoplastic resin. Examples of such another component include a plasticizer such as stearate, talc, silica, and an antioxidant.

It is preferred that the thermoplastic resin powder include, as a thermoplastic resin, at least one type selected from the group consisting of ultra-high molecular weight polyethylene and polyamide.

As the ultra-high molecular weight polyethylene, ultra-high molecular weight polyethylene having weight-average molecular weight of $7.5 \times 10^5$ g/mol or greater and $5 \times 10^7$ g/mol or less is preferred, and ultra-high molecular weight polyethylene having weight-average molecular weight of $1.0 \times 10^6$ g/mol or greater and $1.2 \times 10^7$ g/mol or less is more preferred. Note that the weight-average molecular weight of the ultra-high molecular weight polyethylene shows a value that is measured with the methods below.

1. "Standard Test Method for Dilute Solution Viscosity of Ethylene Polymers," D1601, Annual Book of ASTM Standards, American Society for Testing and Materials.

2. "Standard Specification for Ultra-High-Molecular-Weight Polyethylene Molding and Extrusion Materials," D4020, Annual Book of ASTM Standards, American Society for Testing and Materials A melting point of the ultra-high molecular weight polyethylene is not particularly limited. For example, the melting point of the ultra-high molecular weight polyethylene may be from 130° C. to 135° C. Further, a melt index of the ultra-high molecular weight polyethylene is preferably 1.0 g/10 min (ASTM D1238 (ISO 1133), 190° C., load of 21.6 kg) or less, and more preferably 0.5 g/10 min or less.

As the polyamide, for example, semicrystalline polyamide fine particles having a melting point of 150° C. or higher and 200° C. or lower can be preferably used. Further, as such polyamide, polyamide having an average number of carbon atoms per monomeric unit of 10 or more is preferred.

An average particle diameter of the thermoplastic resin powder is not particularly limited. For example, the average particle diameter of the thermoplastic resin powder may be 0.5 μm or greater, or may be 1 μm or greater. Further, for example, the average particle diameter of the thermoplastic resin powder may be 500 μm or less, or may be 100 μm or less. There is a tendency that increasing the average particle diameter of the thermoplastic resin powder increases voids of the porous molded article to enhance liquid permeability. There is a tendency that reducing the average particle diameter of the thermoplastic resin powder causes the porous molded article to be denser to enhance strength even more.

It is preferred that the thermoplastic resin powder be aspherical resin powder. For example, the thermoplastic resin powder may have a shape that microsphere particles are agglomerated into a shape of a bunch of grapes, or may have a "kompeito"-like shape that a plurality of protrusions are formed on spherical particles. According to the aspherical thermoplastic resin powder, tolerance to dimensional change at the time of swelling tends to be enhanced even more.

It is preferred that the thermoplastic resin powder be porous powder. For example, bulk density of the porous thermoplastic resin powder may be from 0.1 to 0.7 g/cm3, or may be from 0.2 to 0.6 g/cm3. Note that, in this specification, the bulk density of the porous thermoplastic resin powder shows a value that is measured with a method in accordance with ISO 60.

In the embodiment, a ratio d2/d1 of an average particle diameter d2 of the dried gel powder to an average particle diameter d1 of the thermoplastic resin powder is preferably 1.3 or higher. Further, a ratio (d3−d2)/d1 of a difference between the average particle diameter d2 of the dried gel powder and an average particle diameter d3 of the dried gel powder when swollen with water absorption to the average particle diameter d1 of the thermoplastic resin powder is preferably 4.0 or lower. With this configuration, strength of the porous molded article is further enhanced, and thus the porous molded article can be more preferably used as a filter capable of free standing.

The average particle diameter d1 of the thermoplastic resin powder shows a value of D50 that is calculated with a laser diffraction and scattering method in accordance with JIS Z 8825:2013. More Specifically, particle size distribution of the thermoplastic resin powder is calculated with a laser diffraction and scattering method using Mastersizer 3000 available from Malvern Panalytical Ltd (Worcestershire, United Kingdom). Particle sizes are integrated in ascending order from a particle size having the smallest number of particles among all the particle sizes. Then, D50, which corresponds to 50%, is used as the average particle diameter d1.

The average particle diameter d3 of the dried gel powder when swollen with water absorption shows an average particle diameter of the swollen gel obtained by causing the dried gel powder to be swollen with enough water. In the embodiment, the average particle diameter d3 of the swollen gel shows a value of D50 that is calculated with a laser diffraction and scattering method in accordance with JIS Z 8825:2013. More Specifically, particle size distribution of the swollen gel is calculated with a laser diffraction and scattering method using Mastersizer 3000 available from Malvern Panalytical Ltd (Worcestershire, United Kingdom). Particle sizes are integrated in ascending order from a particle size having the smallest number of particles among all the particle sizes. Then, D50, which corresponds to 50%, is used as the average particle diameter d3.

In the embodiment, the average particle diameter d2 of the dried gel powder shows a value that is calculated based on Equation (III) below, using the average particle diameter d3 of the swollen gel, and a linear expansion coefficient α caused due to water absorption of the dried gel powder.

$$\text{Average particle diameter } d2 = \text{average particle diameter } d3/(1+\text{linear expansion coefficient } \alpha) \quad \text{(III)}$$

In the embodiment, the linear expansion coefficient α caused due to water absorption of the dried gel powder shows a value that is calculated with the method below. First, based on apparent density measured with a method in accordance with JIS K 7365:1999, a volume (V1) of the dried gel powder and a volume (V2) of the swollen gel obtained by causing the dried gel powder to be swollen with enough water are calculated. The linear expansion coefficient α can be obtained based on Equation (IV) below, using these volumes V1 and V2.

$$\text{Linear expansion coefficient } \alpha = ((V2/V1)^{1/3} - 1) \quad \text{(IV)}$$

A ratio d2/d1 of the average particle diameter d2 of the dried gel powder to the average particle diameter d1 of the thermoplastic resin powder is preferably 1.3 or higher, and more preferably 2 or higher. Further, the ratio d2/d1 is preferably 50 or lower, and more preferably 25 or lower. With this configuration, the porous molded article can be prevented from being fragile because of dimensional change caused by swelling, and thus a filter having higher strength can be more easily obtained.

A ratio (d3−d2)/d1 of a difference between the average particle diameter d2 of the dried gel powder and the average particle diameter d3 of the dried gel powder when swollen with water absorption to the average particle diameter d1 of the thermoplastic resin powder is 4.0 or lower, and is preferably 3.0 or lower. Further, the ratio (d3−d2)/d1 is preferably 0.2 or higher, and more preferably 0.3 or higher. With this configuration, the porous molded article can be prevented from being fragile because of dimensional change caused by swelling, and thus a filter having higher strength can be more easily obtained.

In the embodiment, the porous molded article is formed by sintering mixed powder including dried gel powder and thermoplastic resin powder.

In one aspect of the porous molded article, it can be said that the porous molded article is a molded article formed in the following manner: particles of dried gel powder are dispersed and fixed in a porous structure that is formed by sintering of thermoplastic resin powder. Further, it can also be said that the porous molded article is a molded article formed in the following manner: particles of dried gel powder are bonded together by thermoplastic resin powder.

The content of the dried gel powder in the mixed powder is preferably 10 parts by mass or greater, and more preferably 25 parts by mass or greater, with respect to 100 parts by mass of the content of the thermoplastic resin powder. Further, the content of the dried gel powder in the mixed powder is preferably 900 parts by mass or less, and more preferably 300 parts by mass or less, with respect to 100 parts by mass of the content of the thermoplastic resin powder.

The mixed powder may further contain, as an additive, a component other than dried gel powder and thermoplastic resin powder. For example, the mixed powder may further contain activated carbon, a medium for reducing heavy metals, a medium for removing arsenic, an antimicrobial medium, an ion exchange medium, iodination, a resin, a fiber, a gas absorbing medium, or the like. A content of such an additive is preferably 20 mass % or less, and more preferably 5 mass % or less, based on the total mass of the mixed powder.

In the embodiment, the mixed powder is loaded into a die or the like according to a desired shape of a porous molded article, and is then sintered. Sintering of the mixed powder can be performed under a condition of causing the thermoplastic resin powder to be fused.

For example, a sintering temperature can be set to a temperature equal to or higher than a melting point of the thermoplastic resin in the thermoplastic resin powder. For example, the sintering temperature may be 140° C. or higher, and is preferably 150° C. or higher. Further, for example, the sintering temperature may be 200° C. or lower, or may be 180° C. or lower.

A period of time of sintering is not particularly limited. For example, the period of time of sintering can be set to from 5 minutes to 120 minutes, and may be from 10 minutes to 60 minutes.

The porous molded article can be formed into various shapes, by appropriately selecting a die into which the mixed powder is loaded at the time of sintering. For example, the porous molded article can be formed into various shapes, such as a disk-like shape, a hollow cylindrical shape, a bell-like shape, a conical shape, and a hollow star-like shape.

For example, a thickness of the porous molded article may be 0.2 mm or greater, and is preferably 1 mm or greater, and more preferably 5 mm or greater. Further, for example, the thickness of the porous molded article may be 1000 mm or less, and is preferably 100 mm or less.

The porous molded article may be a sintered material of mixed powder, or may be a swollen material made by causing the sintered material to be swollen. For example, the sintered material can be swollen with a solvent. Examples of the solvent include water and an organic solvent. In the embodiment, as a polar solvent to cause the sintered material to be swollen, an organic solvent is preferred, and propylene glycol 1-monomethyl ether 2-acetate (PGMEA), propylene glycol monomethyl ether (PGME), cyclohexane, and ethyl lactate are particularly preferred, for example.

The filter according to the embodiment includes the above porous molded article. The filter according to the embodiment may be a filter formed of the porous molded article, or may further include another member or the like as long as the filter can thoroughly remove metal ions.

A shape of the filter according to the embodiment is not particularly limited. For example, the shape of the filter according to the embodiment may be a shape such as a cylindrical shape, a prism shape, a plate-like shape, a bell-like shape, a spherical shape, a semi-spherical shape, and a cuboid shape, and these shapes may be hollow.

In the embodiment, the dried gel powder may be powder having particles larger than particles of the thermoplastic resin powder. Specifically, for example, the average particle diameter of the dried gel powder may be larger than the average particle diameter of the thermoplastic resin powder, and may be two or more times as large as the average particle diameter of the thermoplastic resin powder.

Here, among particles of the dried gel powder, P1 denotes a particle of powder having a projected area 10 or more times as large as an average projected area of a particle of the thermoplastic resin powder. The projected area of the particle of the powder P1 is an area on a surface (at least one surface, preferably both surfaces) of the porous molded article. Further, P2 denotes a particle of powder having a projected area 10 or more times as large as an average projected area of a particle of the thermoplastic resin powder. The projected area of the particle of the powder P2 is an area on a cross-sectional surface dividing the porous molded article into two in a thickness direction. In this case, it is preferred that the number of particles of the powder P1 contained on the surface per unit area be smaller than the number of particles of the powder P2 contained on the cross-sectional surface per unit area. In this case, it can be said that the dried gel powder having a size largely different from a size of the thermoplastic resin powder is present more inside a depth filter, and less on a surface of the depth filter. According to such a depth filter, shedding of the ion exchange resin from the filter surface is less liable to occur, and thus a purer solution can be more easily obtained.

Note that the average projected area of the thermoplastic resin powder described above shows a value that is calculated from the average particle diameter of the thermoplastic resin powder. Specifically, an area of a circle having a diameter equal to the average particle diameter of the thermoplastic resin powder is calculated, and this area is used as the average projected area of the thermoplastic resin powder.

Further, for example, the projected area of the thermoplastic resin powder on the surface of the porous molded article and on the cross-sectional surface dividing the porous molded article into two in the thickness direction can be calculated from an observation image that is observed with a scanning electron microscope.

Here, each of a surface of the porous molded article and a cross-sectional surface dividing the porous molded article into two in a thickness direction is observed with a scanning electron microscope in a range of a field of view of 950 µm×950 µm. Subsequently, five particles of dried gel powder are selected in descending order from a particle having the largest projected area in each field of view. In this case, it is preferred that an average projected area of the five particles of the dried gel powder on the surface be smaller than an average projected area of the five particles of the dried gel powder on the cross-sectional surface. In this case, it can be said that the dried gel powder having a large size is present more inside a depth filter, and less on a surface of the depth filter. According to such a depth filter, shedding of the ion exchange resin from the filter surface is less liable to occur, and thus a purer solution can be more easily obtained.

Regarding the filter according to the embodiment, when water having a specific electrical resistance value of 18 MΩ·cm or greater is caused to pass through the filter according to the embodiment at a space velocity of 1200 hr-1, it is preferred that a specific electrical resistance value of the water after being caused to pass through the filter be 15 MΩ·cm or greater. Note that it is only necessary that the water before being caused to pass through the filter have a specific electrical resistance value of 18 MΩ·cm or greater. The water before being caused to pass through the filter may have a specific electrical resistance value of a theoretical limit value of approximately 18.23 MΩ·cm. Further, an upper limit of the specific electrical resistance value of the water after being caused to pass through the filter is not particularly limited. For example, the upper limit may be equal to or less than a specific electrical resistance value of the water before being caused to pass through the filter. According to such a filter, metal ions in a treatment liquid can be more remarkably removed, and a solution having an even lower metal ion content can be easily obtained.

Note that, in this specification, the specific electrical resistance value of water shows a value that is measured with In-line Resistivity Sensor ERF-001-C-T available from HORIBA, Ltd.

A method of obtaining such a filter is not particularly limited. Examples of the method of obtaining such a filter include a method in which a cleaning liquid is caused to flow through the above porous molded article to clean the above porous molded article. As the cleaning liquid, for example, water, an organic solvent, an acidic solution, an alkaline solution, a mixed liquid of these, or the like can be used. A cleaning condition is not particularly limited. For example, a flow rate at the time of cleaning may be from 10 mL/min to 10 L/min, and a space velocity at the time of cleaning may be from 6 to 6000 hr-1. Further, for example, a temperature of the cleaning liquid at the time of cleaning may be from 1° C. to 99° C.

In the embodiment, when 100 parts by mass of the porous molded article is immersed in 500 parts by mass of propylene glycol 1-monomethyl ether 2-acetate (PGMEA) at 23° C. for 12 hours, it is preferred that a sulfuric acid ion content in the immersion liquid be 0.03 ppm or less. Note that a sulfuric acid ion content in PGMEA before immersion is set to 0.003 ppm or less. Further, a lower limit of the sulfuric acid ion content in the immersion liquid is not particularly limited. For example, the lower limit of the sulfuric acid ion content in the immersion liquid may be a detectable limit or less.

Note that, in this specification, the sulfuric acid ion content in PGMEA shows a value that is measured with Ion Chromatography (DIONEX ICS-2100) available from Thermo Fisher Scientific K.K.

A method of obtaining such a filter is not particularly limited. Examples of the method of obtaining such a filter include a method of using dried gel powder containing an ion exchange resin and a nitrogen-containing chelating resin.

Removal Method of Metal Ions

A removal method of metal ions according to the embodiment is a method of removing metal ions in a treatment liquid, and includes a liquid-passing step of causing a treatment liquid to pass through the filter described above.

According to the removal method of the embodiment, metal ions (such as Na ions, Fe ions, K ions, Ca ions, Co ions, Cr ions, and Ni ions, in particular) can be efficiently removed, and thus a liquid having an extremely low metal ion content (e.g., a liquid having a content of each of the metal ions of 500 ppt or less, more preferably 150 ppt or less, and more preferably 100 ppt or less) can be obtained.

In the embodiment, the content of metal ions in a treatment liquid is not particularly limited. For example, the content of metal ions in a treatment liquid may be 1 ppb or greater, or may be 100 ppb or greater. An upper limit of the content of metal ions in a treatment liquid is not particularly limited. For example, the upper limit of the content of metal ions in a treatment liquid may be 100 ppm or less, or may be 1000 ppb or less.

The treatment liquid may be a water-based solvent such as water, an organic solvent such as PGMEA, or a mixed liquid of these.

A condition when a treatment liquid is caused to pass through the filter is not particularly limited. For example, a space velocity (SV) may be from 6 to 200 hr-1. Further, for example, a primary pressure may be from 20 to 300 kPa.

The treatment liquid may further contain an organic compound. In other words, in the embodiment, metal ions can also be removed from a solution obtained by dissolving an organic compound in a solvent. Further, in the embodiment, metal ions can also be removed after an additive is added to a treatment liquid.

In one preferred aspect, the above removal method may be a method of removing metal ions in a treatment liquid containing a compound including an acidic group. In this case, the above removal method may be a method including an addition step of adding a strong base to the above treatment liquid, and a liquid-passing step of causing the treatment liquid, to which the strong base is added, to pass through the filter according to the above embodiment.

In the above aspect, through the addition step, metal ions can be more remarkably removed from a treatment liquid containing a compound including an acidic group.

The compound including an acidic group may be a low molecular weight compound, or may be a high molecular weight compound. Examples of the acidic group include a phenolic hydroxyl group, a carboxyl group, a sulfone group, and a nitric acid group. Among these, the phenolic hydroxyl group is preferred, from an aspect that the phenolic hydroxyl group more remarkably produces an effect achieved by the addition step.

For example, the compound including an acidic group may include at least one type selected from the group consisting of a phenolic resin, an acrylic resin, an epoxy resin, a silicone resin, and a monomer that is a raw material for these resins. Further, it is preferred that the compound including an acidic group include a phenolic resin, from an aspect that the compound including an acidic group more remarkably produces an effect achieved by the addition step.

The strong base used in the addition step is not particularly limited. Examples of the strong base include metal hydroxide such as sodium hydroxide, and tetraalkylammonium hydroxide such as tetramethylammonium hydroxide.

An equivalent ratio of the strong base to the acidic group in a treatment liquid is preferably $1.0 \times 10^{-9}$ or higher, and more preferably $1.0 \times 10^{-8}$ or higher. Further, the above equivalent ratio is preferably $1.0 \times 10^{-4}$ or lower, and more preferably $1.0 \times 10^{-5}$ or lower. With this configuration, metal ions are more remarkably removed in the liquid-passing step.

In the embodiment, the treatment liquid may be a liquid that has passed through another filter. In other words, the liquid-passing step may be a step including a first liquid-passing step of causing a treatment liquid to pass through a first filter, and a second liquid-passing step of causing the treatment liquid, which has been subjected to the first liquid-passing step, to pass through a second filter. In this case, the filter described above is used as the second filter, and the first filter is not particularly limited.

In one preferred aspect, the above first filter may be a filter including a porous molded article, which is a sintered material of mixed powder or a swollen material of the sintered material. The mixed powder contains dried gel powder including an ion exchange resin, and thermoplastic resin powder.

As an exemplary example of the first filter of the aspect, a filter similar to the filter according to the above embodiment may be given. Note that, regarding the first filter, when water having a specific electrical resistance value of 18 MΩ·cm is caused to pass through the first filter at a space velocity of 1200 hr-1, a specific electrical resistance value of the water after being caused to pass through the first filter need not be 15 MΩ·cm or greater.

In the aspect, it is preferred that the second filter (i.e., the filter according to the above embodiment) be a filter that contains, as its dried gel powder, an ion exchange resin including a sulfonic acid group, and a nitrogen-containing chelating resin. Further, it is preferred that the ion exchange resin of the first filter include at least one type of group selected from the group consisting of an aminophosphoric acid group, an iminodiacetic acid group, and a tertiary amino group. According to such a combination of the first filter and the second filter, even when a plurality of metal ions are contained in a treatment liquid (e.g., iron ions and sodium ions), each of the metal ions can be remarkably reduced.

Metal Ion Removal Device

A metal ion removal device according to the embodiment includes a removal unit including the filter according to the above embodiment.

Figure 2:
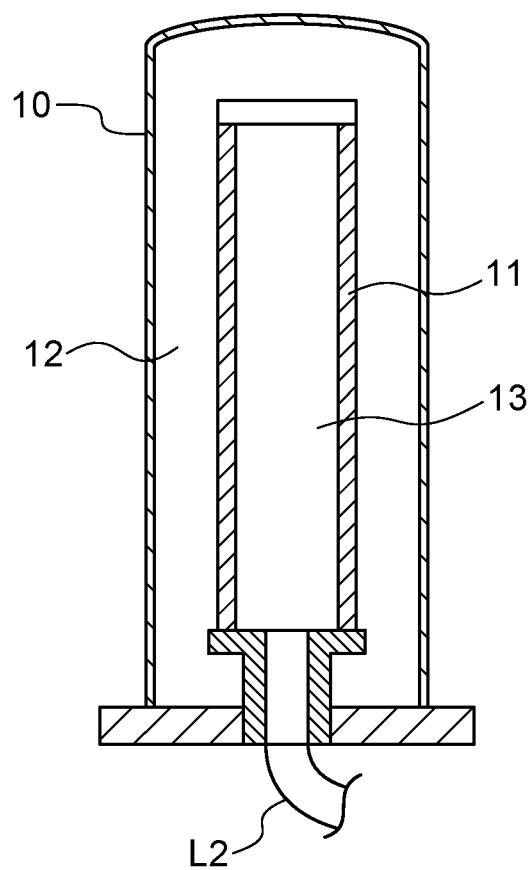
FIG. 2 is a diagram illustrating a cross-sectional plane taken along the line II-II of FIG. 1.

FIG. 1 is a diagram for describing one preferred mode of a metal ion removal device. FIG. 2 is a diagram illustrating a cross-section taken along the line II-II of FIG. 1. A metal ion removal device 100 illustrated in FIG. 1 includes a removal unit 10 including a filter 11 according to the above embodiment, a first tank 20 that stores a treatment liquid 21, and a second tank 30 that stores a liquid 31 after metal ion removal. Further, the inside of the removal unit 10 is divided into a first area 12 and a second area 13 by the filter 11.

The first tank 20 and the removal unit 10 are coupled together with a first line L1. The treatment liquid 21 in the first tank 20 passes through the first line L1 to be supplied to the first area 12 of the removal unit 10. The treatment liquid 21 that has been supplied to the first area 12 passes through the filter 11 to be transferred to the second area 13. At this time, metal ions in the treatment liquid 21 are removed by the filter 11. The second tank 30 and the removal unit 10 are coupled together with a second line L2. The treatment liquid (liquid 31) that has passed through the filter 11 passes through the second line L2, so that the treatment liquid (liquid 31) is supplied from the second region 13 to the second tank 30.

Figure 3:
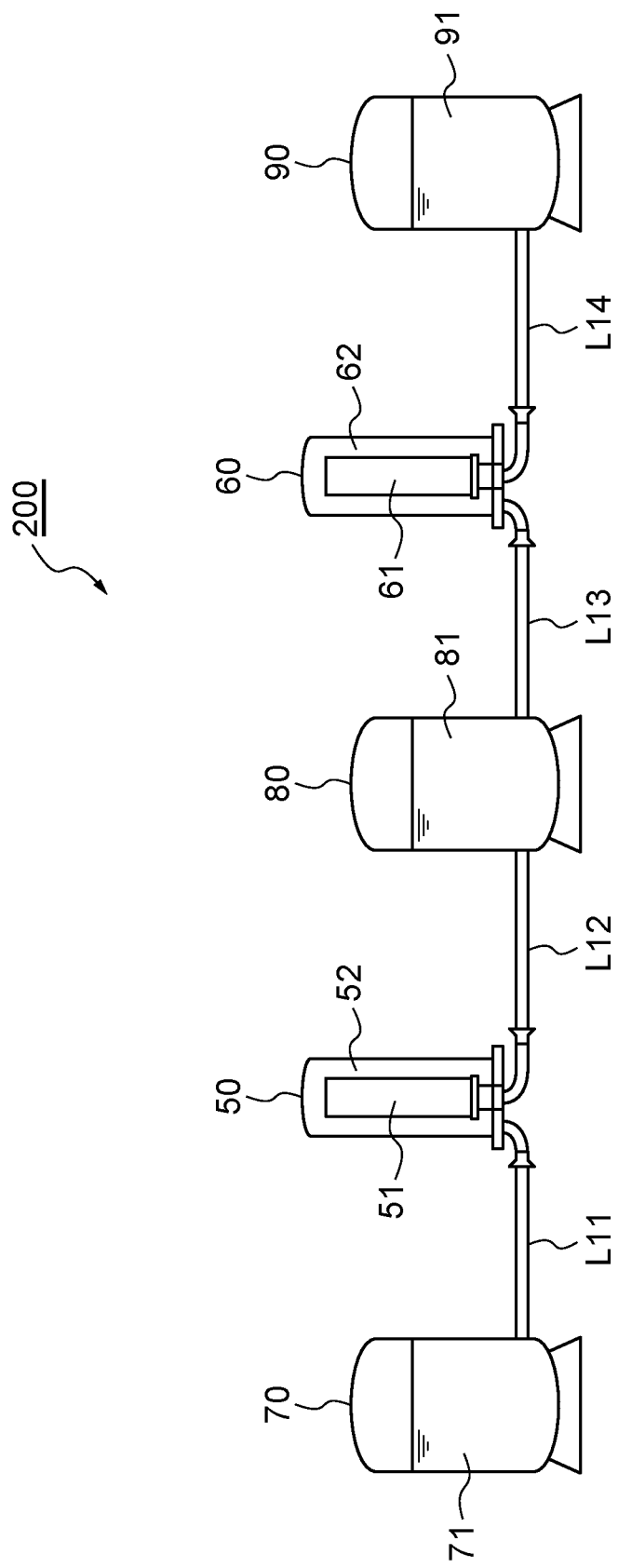
FIG. 3 is a diagram illustrating another embodiment of a metal ion removal device.

FIG. 3 is a diagram for describing another preferred mode of a metal ion removal device. A metal ion removal device 200 illustrated in FIG. 3 includes a first removal unit 50 including a first filter 51, a second removal unit 60 including a second filter 61, a first tank 70 that stores a treatment liquid 71, a second tank 80 that stores an intermediate liquid 81 that has passed through the first filter 51, and a third tank 90 that stores a liquid 91 that has passed through the second filter 61 to have its metal ions removed. The second filter 61 is the filter according to the above embodiment.

The first tank 70 and the first removal unit 50 are coupled together with a first line L11. The treatment liquid 71 in the first tank 70 passes through the first line L11 to be supplied to the first removal unit 50. The treatment liquid 71 that has been supplied to the first removal unit 50 is caused to pass through the first filter 51. The first removal unit 50 is coupled to the second tank 80 with a second line L12. The intermediate liquid 81 that has passed through the first filter 51 passes through the second line L12 to be supplied to the second tank 80.

The second tank 80 and the second removal unit 60 are coupled together with a third line L13. The intermediate liquid 81 in the second tank 80 passes through the third line L13 to be supplied to the second removal unit 60. The intermediate liquid 81 that has been supplied to the second removal unit 60 is caused to pass through the second filter 61. The second removal unit 60 is coupled to the third tank 90 with a fourth line L14. The liquid 91 that has passed through the second filter 61 to have its metal ions removed passes through the fourth line L14 to be supplied to the third tank 90.

The first filter 51 according to the embodiment is a filter including a porous molded article, which is a sintered material of mixed powder or a swollen material of the sintered material. The mixed powder contains dried gel powder including a nitrogen-containing chelating resin, and thermoplastic resin powder. In this case, the second filter 61 is the filter described above.

In the embodiment, regarding the first filter 51, when water having a specific electrical resistance value of 18 MΩ·cm or greater is caused to pass through the first filter 51 at a space velocity of 1200 hr-1, a specific electrical resistance value of the water after being caused to pass through the first filter 51 may be less than 15 MΩ·cm.

In the aspect, it is preferred that the second filter 61 (i.e., the filter according to the above embodiment) be a filter that contains, as its dried gel powder, an ion exchange resin including a sulfonic acid group, and a nitrogen-containing chelating resin. Further, it is preferred that the ion exchange resin of the first filter 51 include at least one type of group selected from the group consisting of an aminophosphoric acid group, an iminodiacetic acid group, and a tertiary amino group. According to such a combination of the first filter 51 and the second filter 61, even when a plurality of metal ions are contained in a treatment liquid (e.g., iron ions and sodium ions), each of the metal ions can be remarkably reduced.

The preferred embodiment is described in the above. However, the present disclosure is not limited to the above embodiment.

EXAMPLES

The present disclosure will be further specifically described below with reference to Examples. However, the present disclosure is not limited to the Examples.

Example 1

Dried Gel Powder A-1

Strong acidic cation exchange resin particles (25 parts by mass) including a sulfonic acid group and chelating resin particles (5 parts by mass) including an aminophosphoric acid group were mixed together. The mixture was dried in an oven (DRM620DB available from Advantec Toyo Kaisha, Ltd. (Bunkyo-ku, Tokyo)) at 110° C. for 36 hours or more. In this manner, dried gel powder having an average particle diameter of 440 μm was obtained. Subsequently, the dried gel powder was pulverized to prepare dried gel powder A-1 having an average particle diameter d2 of 90 μm.

Thermoplastic Resin Powder A-1

As thermoplastic resin powder, trade designation "GUR 2126" (ultra-high molecular weight polyethylene powder, weight-average molecular weight: approximately $4.5 \times 10^6$ g/mol, average particle diameter d1: 32 μm) available from Celanese Corporation (Oberhausen, Germany) was used. Specifically, d2 is two or more times as large as d1.

Manufacturing of Filter A-1

The dried gel powder A-1 (30 parts by mass) and the thermoplastic resin powder A-1 (70 parts by mass) were mixed together. The mixture was loaded into a die, and was then heated in an oven at 160° C. for 10 minutes. In this manner, a hollow cylindrical filter having an outer diameter of approximately 60 mm, an inner diameter of approximately 28 mm, and a length of approximately 50 mm was manufactured. An opening portion of the manufactured filter on one side was closed, so that a treatment liquid flowed into the inside of the filter from the outside. The manufactured filter was treated with a cleaning liquid for 72 hours or more. In this manner, a filter A-1 was obtained.

Water having a specific electrical resistance value of 18 MΩ·cm was caused to pass through the obtained filter A-1 at a space velocity of 1200 hr-1. In this case, a specific electrical resistance value of the water after being caused to pass through the filter A-1 was 18 MΩ·cm. Further, the obtained filter A-1 was immersed in PGMEA having mass 5 times the mass (mass ratio) of the filter A-1 at room temperature (23° C.) for 12 hours, and a content of sulfuric acid ions in the immersion liquid was measured. In this case, the content of sulfuric acid ions in the immersion liquid was less than 0.003 ppm.

Further, dried gel powder on a surface and a cross-sectional surface of the obtained filter A-1 was observed. Specifically, the filter A-1 was frozen with liquid nitrogen and was then cut with a knife so that the filter A-1 was divided into two in a thickness direction. In this manner, a sample to be measured was manufactured. Surface observation was performed on each of an outer surface, an inner surface, and a cross-sectional surface of the filter A-1 with the use of a scanning electron microscope (SEM) (magnification: 100 times). Further, sulfur distribution was analyzed with energy dispersive X-ray spectroscopy (EDX). With the analysis, the position of ion exchange resin was located to determine dried gel powder. Next, in a freely selected range of a field of view of 950 μm×950 μm, five particles of the dried gel powder were selected in descending order from the largest particle (note that particles that were partly cut off from the range of a field of view were excluded). A projected area of each of the selected five particles of the powder was measured, and an average value of the projected areas was then calculated. Table 1 shows the result. As shown in Table 1, each average value of both the surfaces (the outer surface and the inner surface) is smaller than (equal to or less than ⅔ of) an average value of the cross-sectional surface.

Figure 4A:
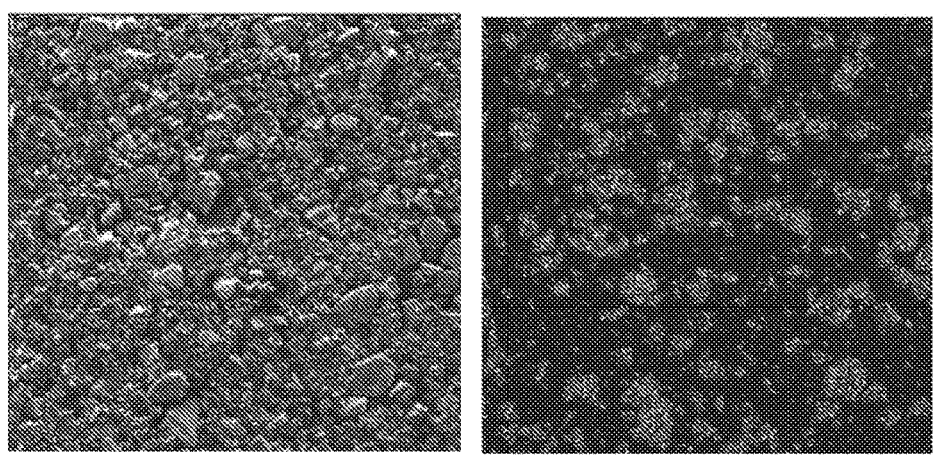
FIG. 4(a) is an image of an outer surface of a porous molded article according to Example 1.
Figure 4B:
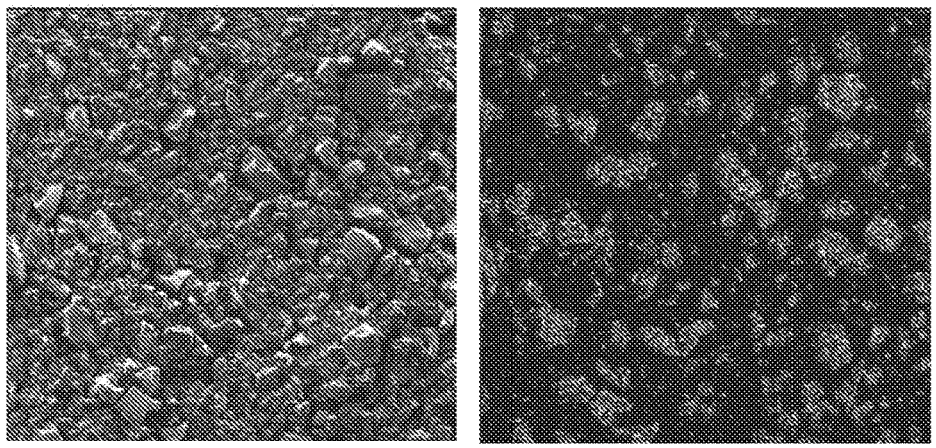
FIG. 4(b) is an image of an inner surface of the porous molded article according to Example 1.
Figure 4C:
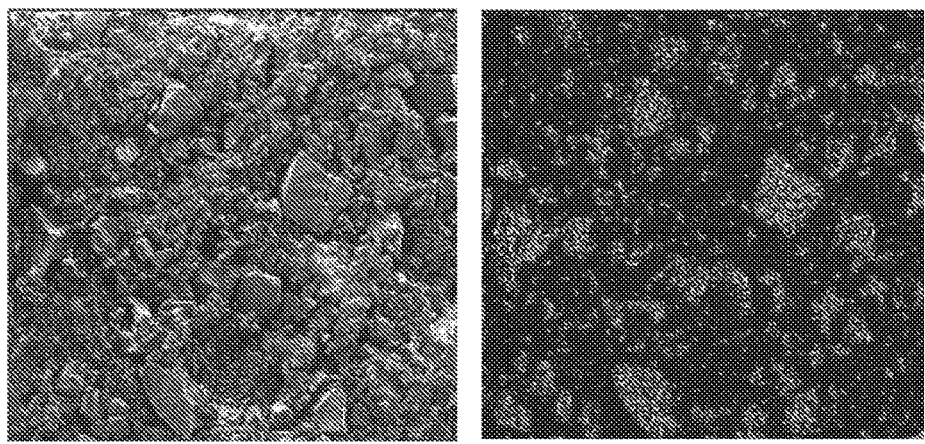
FIG. 4(c) is an image of a cross section dividing the porous molded article into two in a thickness direction according to Example 1.

FIG. 4(a) shows an SEM observation image and an EDX analysis result of the outer surface of the filter A-1. FIG. 4(b) shows an SEM observation image and an EDX analysis result of the inner surface of the filter A-1. FIG. 4(c) shows an SEM observation image and an EDX analysis result of the cross-sectional surface of the filter A-1.

TABLE 1

|  | Outer surface | Inner surface | Cross-sectional surface |
|---|---|---|---|
| Particle 1 | 6900 | 7900 | 18000 |
| Particle 2 | 6200 | 6500 | 12000 |
| Particle 3 | 5700 | 6400 | 12000 |
| Particle 4 | 5500 | 6400 | 10000 |
| Particle 5 | 4800 | 6100 | 9500 |
| Average value | 5800 | 6700 | 11000 |

(μm²)

In Example 1, since the average particle diameter of the thermoplastic resin powder is 32 μm, an average projected area of the thermoplastic resin powder can be assumed to be 803 μm2. The number of contained particles of the dried gel powder having a projected area 10 or more times as large as the average projected area of the thermoplastic resin powder (8030 μm2 or greater) was calculated from the SEM observation images of the outer surface, the inner surface, and the cross-sectional surface of the filter A-1. In this case, it was confirmed that the number of contained particles on each of the outer surface and the inner surface was smaller than the number of contained particles on the cross-sectional surface.

Comparative Example 1

Dried Gel Powder B-1

Strong acidic cation exchange resin particles including a sulfonic acid group were dried in an oven (DRM620DB available from Advantec Toyo Kaisha, Ltd. (Bunkyo-ku, Tokyo)) at 110° C. for 36 hours or more. In this manner, dried gel powder having an average particle diameter of 440 μm was obtained. Subsequently, the dried gel powder was pulverized to prepare dried gel powder B-1 having an average particle diameter d2 of 90 μm.

Manufacturing of Filter B-1

The dried gel powder B-1 (50 parts by mass) and the thermoplastic resin powder A-1 (50 parts by mass) were mixed together. The mixture was loaded into a die, and was then heated in an oven at 160° C. for 10 minutes. In this manner, a hollow cylindrical filter having an outer diameter of approximately 60 mm, an inner diameter of approximately 28 mm, and a length of approximately 250 mm was manufactured. An opening portion of the manufactured filter on one side was closed, so that a treatment liquid flowed into the inside of the filter from the outside. The manufactured filter was treated with a cleaning liquid for 48 hours or more. In this manner, a filter B-1 was obtained.

Water having a specific electrical resistance value of 18 MΩ·cm was caused to pass through the obtained filter B-1 at a space velocity of 1200 hr-1. In this case, a specific electrical resistance value of the water after being caused to pass through the filter B-1 was 17.6 MΩ·cm. Further, the obtained filter B-1 was immersed in PGMEA at room temperature (23° C.) for 12 hours, and a content of sulfuric acid ions in the immersion liquid was measured. In this case, the content of sulfuric acid ions in the immersion liquid was 0.64 ppm.

Flow Test 1 (Flow Test of Solution Containing Phenolic Resin)

A PGMEA solution including 5 mass % of a phenolic resin (SP1006N available from ASAHI YUKIZAI CORPORATION) was caused to pass through the filters obtained in Example 1 and Comparative Example 1 above, with a condition of a primary-side pressure of 50 kPa and a flow rate of 100 ml/min. A content of iron ions in the solution before and after being caused to pass through the filters was measured. Table 2 shows the result.

Example 2

Dried Gel Powder A-2

Chelating resin particles including an aminophosphoric acid group were dried in an oven (DRM620DB available from Advantec Toyo Kaisha, Ltd. (Bunkyo-ku, Tokyo)) at 110° C. for 36 hours or more. In this manner, dried gel powder having an average particle diameter of 440 μm was obtained. Subsequently, the dried gel powder was pulverized to prepare dried gel powder A-2 having an average particle diameter d2 of 90 μm.

Manufacturing of First Filter

The dried gel powder A-2 (40 parts by mass) and the thermoplastic resin powder A-1 (60 parts by mass) were mixed together. The mixture was loaded into a die, and was then heated in an oven at 160° C. for 10 minutes. In this manner, a disk-like filter having a diameter of approximately 47 mm and a thickness of approximately 5 mm was manufactured. The manufactured filter was designed in such a manner that a treatment liquid flowed through the manufactured filter from an upper side to a lower side of the filter. A first filter was obtained, without performing treatment on the manufactured filter with a cleaning liquid.

Water having a specific electrical resistance value of 18 MΩ·cm was caused to pass through the obtained first filter at a space velocity of 1200 hr-1. In this case, a specific electrical resistance value of the water after being caused to pass through the first filter was 0.4 MΩ·cm.

Manufacturing of Second Filter

Similarly to the filter A-1, a second filter was obtained.

Water having a specific electrical resistance value of 18 MΩ·cm was caused to pass through the obtained second filter at a space velocity of 1200 hr-1. In this case, a specific electrical resistance value of the water after being caused to pass through the second filter was 18 MΩ·cm. Further, the obtained second filter was immersed in PGMEA at room temperature (23° C.) for 12 hours, and a content of sulfuric acid ions in the immersion liquid was measured. In this case, the content of sulfuric acid ions in the immersion liquid was less than 0.003 ppm.

Manufacturing of Metal Ion Removal Device

The first filter and the second filter were coupled in such a manner that a treatment liquid flowed through the first filter and the second filter in this order. In this manner, the metal ion removal device was manufactured.

Flow Test 2 (Flow Test of Solution Containing Phenolic Resin)

A PGMEA solution including 5 mass % of a phenolic resin (SP1006N manufactured by ASAHI YUKIZAI CORPORATION) was supplied to the metal ion removal device obtained in Example 2 above, and the PGMEA solution was caused to pass through the first filter and the second filter. A content of iron ions in the solution before and after being caused to pass through the filters was measured. Table 2 shows the result.

TABLE 2

| | | Example 1 | Comparative Example 1 | Example 2 |
|---|---|---|---|---|
| Fe content (PPt) | Before liquid is caused to pass through filter | 1650 | 180 | 1650 |
| | After liquid is caused to pass through filter | 70 | 43 | <30 |
| | Removal rate | 96% | 76% | 98% |

REFERENCE SIGNS LIST

10: Removal unit, 11: Filter, 20: First tank, 30: Second tank, 100: Metal ion removal device, 50: First removal unit, 51: First filter, 60: Second removal unit, 61: Second filter, 70: First tank, 80: Second tank, 90: Third tank, 200: Metal ion removal device.

The invention claimed is:

1. A metal ion removal device comprising:
a first filter configured such that, when water having a specific electrical resistance value of 18 MΩ·cm or greater is caused to pass through the first filter at a space velocity of 1200 hr$^{-1}$, a specific electrical resistance value of the water after being caused to pass through the first filter is less than 15 MΩ·cm; and
a second filter configured to remove metal ions from a treatment liquid that has passed through the first filter, wherein
the first filter is a filter including a porous molded article, the porous molded article being a sintered material of mixed powder or a swollen material of the sintered material, the mixed powder containing dried gel powder including a nitrogen-containing chelating resin, and thermoplastic resin powder, and
the second filter comprising a porous molded article being a sintered material of mixed powder or a swollen material of the sintered material, the mixed powder containing dried gel powder and thermoplastic resin powder, wherein
the dried gel powder contains an ion exchange resin including a sulfonic acid group, and a nitrogen-containing chelating resin; and
a ratio (C1/C2) of a content C1 of the ion exchange resin to a content C2 of the nitrogen-containing chelating resin is 0.1 or higher and 100 or lower in a mass ratio.

2. A depth filter comprising
a porous molded article being a sintered material of mixed powder or a swollen material of the sintered material, the mixed powder containing dried gel powder including an ion exchange resin, and thermoplastic resin powder, wherein
an average particle diameter of the dried gel powder is two or more times as large as an average particle diameter of the thermoplastic resin powder, and
when each of a surface of the porous molded article and a cross-sectional surface dividing the porous molded article into two in a thickness direction is observed with a scanning electron microscope in a range of a field of view of 950 μm×950 μm and subsequently an average projected area of five particles having large projected areas of the dried gel powder is calculated in each field of view,
the average projected area on the surface is smaller than the average projected area on the cross-sectional surface.

3. A metal ion removal device comprising:
a first filter; and
a second filter configured to remove metal ions from a treatment liquid that has passed through the first filter, wherein
the first filter is a filter including a porous molded article, the porous molded article being a sintered material of mixed powder or a swollen material of the sintered material, the mixed powder containing dried gel powder including a nitrogen-containing chelating resin, and thermoplastic resin powder, and
the second filter comprising
a porous molded article being a sintered material of mixed powder or a swollen material of the sintered material, the mixed powder containing dried gel powder including an ion exchange resin, and thermoplastic resin powder, wherein
the ion exchange resin is an ion exchange resin including a sulfonic acid group, and the dried gel powder further includes a nitrogen-containing chelating resin,
a ratio (C1/C2) of a content C1 of the ion exchange resin to a content C2 of the nitrogen-containing chelating resin is 0.1 or more and 100 or less in a mass ratio,
a number of particles of powder P1 contained on a surface per unit area is smaller than a number of particles of powder P2 contained on a cross-sectional surface per unit area, the surface being a surface of the porous molded article, the cross-sectional surface being a surface dividing the porous molded article into two in a thickness direction, where, among particles of the dried gel powder, P1 denotes a particle of powder having a projected area 10 or more times as large as an average projected area of a particle of the thermoplastic resin powder, the projected area of the particle of the powder P1 being an area on the surface, and P2 denotes a particle of powder having a projected area 10 or more times as large as an average projected area of a particle of the thermoplastic resin powder, the projected area of the particle of the powder P2 being an area on the cross-sectional surface, and
the first filter is a filter configured such that, when water having a specific electrical resistance value of 18 MΩ·cm or greater is caused to pass through the first filter at a space velocity of 1200 l hr$^{-1}$, a specific electrical resistance value of the water after being caused to pass through the first filter is less than 15 MΩ·cm.

* * * * *